(12) United States Patent
Kumar et al.

(10) Patent No.: US 9,107,218 B1
(45) Date of Patent: Aug. 11, 2015

(54) SELECTIVE ALLOWANCE OF UPLINK TRANSMISSION WITHOUT RESOURCE BLOCK ASSIGNMENT

(71) Applicant: Sprint Spectrum L.P., Overland Park, KS (US)

(72) Inventors: Rajat Kumar, Kansas City, MO (US); Suryanarayanan Ramamurthy, Olathe, KS (US); Talat Jamshidi, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 25 days.

(21) Appl. No.: 13/960,105

(22) Filed: Aug. 6, 2013

(51) Int. Cl.
*H04W 72/00* (2009.01)
*H04W 72/04* (2009.01)

(52) U.S. Cl.
CPC .................................. *H04W 72/048* (2013.01)

(58) Field of Classification Search
CPC .................................................. H04W 72/048
USPC ................. 455/452.1; 370/329, 341
See application file for complete search history.

(56) References Cited

U.S. PATENT DOCUMENTS

| | | | | |
|---|---|---|---|---|
| 6,646,988 | B1* | 11/2003 | Nandy et al. ................. | 370/235 |
| 2008/0117869 | A1* | 5/2008 | Freen et al. .................. | 370/329 |
| 2009/0059789 | A1* | 3/2009 | Underwood ................. | 370/235 |
| 2009/0201875 | A1* | 8/2009 | Hasegawa et al. ........... | 370/329 |
| 2010/0316012 | A1* | 12/2010 | Stanwood et al. ........... | 370/329 |
| 2011/0116428 | A1* | 5/2011 | Seong et al. ................. | 370/311 |
| 2011/0317636 | A1* | 12/2011 | Diachina et al. ............. | 370/329 |
| 2012/0172672 | A1* | 7/2012 | Pekarske et al. ............. | 600/300 |
| 2013/0322366 | A1* | 12/2013 | Racz et al. ................... | 370/329 |

* cited by examiner

Primary Examiner — Charles Shedrick (57) ABSTRACT

A method and system for selectively allowing uplink wireless transmission from a wireless communication device (WCDs) to a base station without a resource block assignment. Certain resource blocks may be designated for this use but still available for assignment to particular WCDs. When the base station receives data in such a resource block without having assigned the resource block for use by any WCD, the base station may determine based on a class or other identity of the transmitting WCD whether to forward the received data for transmission onto a transport network or rather whether to discard the data. The base station may then act accordingly. This arrangement may help improve performance in a scenario where many WCDs in a coverage area, such as embedded WCDs, would tend to transmit small amounts of data often, but the disclosed arrangement is more generally applicable as well.

20 Claims, 5 Drawing Sheets

SELECTIVE ALLOWANCE OF UPLINK TRANSMISSION WITHOUT RESOURCE BLOCK ASSIGNMENT

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of WCDs, initiation of communications, handoff between coverage areas, and other functions.

In accordance with the air interface protocol, each coverage area may operate on particular frequency spectrum in the form of one or more ranges of radio frequency (RF) spectrum defining a frequency bandwidth of the coverage area. Depending on the air interface protocol, the coverage area may use different spectrum for its uplink and downlink or may use the same spectrum allocated over time or in another manner between its uplink and downlink. Further, various coverage areas of the network could use the same frequency spectrum as each other, with communications in adjacent coverage areas being modulated or otherwise encoded to distinguish one coverage area from another.

In each coverage area, the air interface may then be divided into a plurality of "resource blocks" for carrying communications wirelessly between the WCDs and the base station. These resource blocks may take various forms, depending on the air interface protocol. For instance, in a representative LTE system, the air interface may be divided over time into 0.5 millisecond timeslots, and in each timeslot the bandwidth of the coverage area may be divided into resource blocks each spanning 180 kHz. Thus, every 0.5 milliseconds, the air interface would define a number of 180 kHz resource blocks that would fit within the available bandwidth.

Further, the air interface may define various channels for communication between the WCDs and the base station. For instance, on the downlink, the air interface may define a pilot channel or reference channel on which the base station broadcast a signal that WCDs may monitor to evaluate coverage strength, an downlink control channel for carrying control signals from the base station to WCDs, and one or more downlink traffic channels for carrying communication traffic to WCDs And on the uplink, the air interface may define an uplink control channel for carrying control signals from WCDs to the base station, and one or more uplink traffic channels for carrying communication traffic from WCDs. These various channels may be defined in particular resource blocks or portions of resource blocks.

In general, when a WCD is served by a particular base station, the base station (alone or with the assistance of associated network infrastructure) may manage assignment of resource blocks to the WCD for use to carry uplink communication traffic from the WCD to the base station. In practice, for instance, when a WCD has data to communicate on the Internet, the WCD may transmit to the base station a service request message informing the base station that the WCD has data to communicate, and the base station may then assign one or more upcoming resource blocks on the uplink for use by the WCD to transmit that data and may send to the WCD a control signal specifying the assigned resource block(s). The WCD may then transmit its data to the base station in the assigned resource block(s), and the base station may forward the data for transmission on the Internet.

OVERVIEW

With advances in wireless communication and network technology, it is anticipated that the number of WCDs in operation will continue to grow. Beyond cell phones and other end-user communication devices, one area of particular growth may be wireless communication devices that are embedded or built into appliances, machines, and other objects, such as utility meters, parking meters, automobiles, courier packages, and the like.

Each of these embedded WCDs, when registered with the cellular wireless network, may have a respective Internet Protocol (IP) address (e.g., an IPv6 address) for communicating on the Internet and may be arranged to transmit a small amount of data (e.g., usage reports, synchronization messages, etc.) fairly often. Each time such a device has data to transmit, however, the device may need to engage in the above-described control signaling with the base station in order to request and receive assignment of one or more resource blocks before then transmitting the data to the base station on the assigned resource block(s). As the number of these embedded WCDs increases, their control and data communication with the base station in a given coverage area could begin to cause significant air interface congestion, possibly causing problems for end-user WCDs seeking to communicate in the same coverage area. Consequently, an improvement is desired.

Disclosed herein is an arrangement that enables select WCDs to engage in uplink data transmission to a base station without the need to request and receive a resource block assignment from the base station. Certain WCDs, such as embedded WCDs of a particular type, may be deemed members of a class entitled to engage in this sort of communication, so as to help avoid having communications from such devices overwhelm the air interface in any given coverage area.

In accordance with the disclosure, one or more particular resource blocks of the air interface may be designated as eligible to carry uplink transmissions from such WCDs without the base station having received a corresponding request for resource block assignment and without the base station having assigned the resource block(s) at issue to any particular WCD. At the same time, however, to help avoid unduly limiting the number of resource blocks available for use in general, all of the resource blocks (including the one or more particular resource blocks) as appropriate in the air interface protocol at issue may still be eligible to carry uplink transmissions pursuant to resource block assignment by the base station. Thus, when one of the select WCDs has data to transmit, it may transmit that data on one or more of the particular resource blocks designated to carry such transmission without requesting and receiving an assignment of the resource block(s). Whereas, any other WCD that has data to transmit may follow the procedure of requesting and receiving an assignment of one or more resource blocks, which might include one or more of the particular resource blocks, and only then may transmit the data on the assigned resource block(s).

Accordingly, in one respect, disclosed is a method operable by a cellular base station (by itself or with the assistance of one or more other network entities). Pursuant to the method, the base station provides service on an air interface defining a plurality of resource blocks, and the base station wirelessly receives data transmitted to the base station in at least one of the resource blocks. Further, the base station makes a determination of whether the base station has assigned the at least one resource block for use by any particular WCD for uplink transmission to the base station.

If the determination is affirmative, then the base station processes the received data in accordance with the assignment, perhaps forwarding the data along (e.g., to a gateway system) for transmission onto a transport network. On the other hand if the determination is negative, then the base station determines a class of WCD from which the data was transmitted to the base station in the at least one resource block, and, based on the determined class, the base station makes a decision of whether to discard the received data or rather to forward the received data along for transmission onto the transport network. The base station then implements the decision.

In another respect, disclosed is another method operable in a wireless communication system in which a base station operates on an air interface defining a plurality of resource blocks for wirelessly carrying data transmitted from WCDs to the base station. In such a system, the base station normally assigns the resource blocks to the WCDs in response to uplink-transmission requests received from the WCDs, and the base station normally receives data wirelessly transmitted from the WCDs in the assigned resource blocks and passes the received data along to a gateway system for transmission of the data onto a transport network.

In this method, the base station receives data wirelessly transmitted to the base station in one or more unassigned of resource blocks and without the base station having received from any WCD a corresponding uplink-transmission request for the received data. The base station then determines an identity (e.g., class) of a WCD that transmitted the data in the unassigned one or more resource blocks. And based on the determined identity of the WCD, the base station makes a decision of whether to discard the data received in the one or more unassigned resource blocks or rather to forward the data received in the one or more unassigned resource blocks to the gateway system for transmission onto the transport network. The base station then implements the decision.

In still another respect, disclosed is a cellular base station arranged to carry out these or other such methods. The base station includes an antenna structure that is arranged to transmit and receive over an air interface that defines a plurality of resource blocks, and the base station includes a controller. The controller is arranged to receive data that wirelessly arrived at the antenna structure in at least one of the resource blocks. And the controller is arranged to then make a determination of whether the at least one resource block was assigned for use by any particular WCD for uplink transmission to the base station, and (a) if the determination is affirmative, then to process the received data in accordance with the assignment but (b) if the determination is negative, then (i) to determine a class of wireless communication device from which the data was transmitted to the cellular base station in the at least one resource block, (ii) based on the determined class, to make a decision of whether to discard the received data or rather to forward the received data along to a gateway system for transmission onto a transport network, and (iii) to cause the base station to implement the decision.

These as well as other aspects, advantages, and alternatives will become apparent to those of ordinary skill in the art by reading the following detailed description, with reference where appropriate to the accompanying drawings. Further, it should be understood that the description provided in this overview and elsewhere in this document is provided by way of example only.

DETAILED DESCRIPTION

Referring to the drawings, as noted above, FIG. 1 is a simplified block diagram of a wireless communication system in which the present disclosure can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
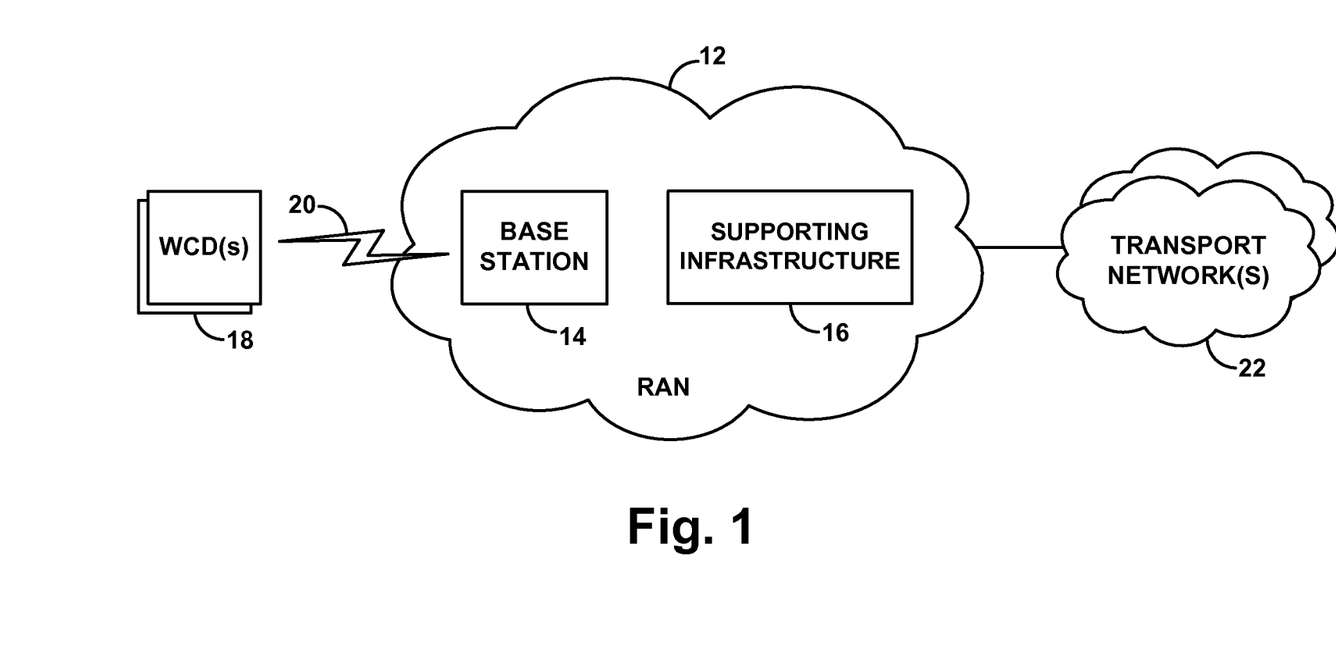
FIG. 1 is a simplified block diagram of an example wireless communication system in which the present disclosure can be implemented.

FIG. 1 depicts the example communication system as including at its core a radio access network (RAN) 12 having a representative base station 14 and supporting network infrastructure 16, with the base station 14 being arranged to serve WCDs 18 in a coverage area defining an air interface 20. RAN 12 then provides connectivity with one or more transport networks 22, such as the PSTN or the Internet for instance. With this arrangement, each WCD that is in coverage of the base station and that is suitably equipped may register or attach with the RAN and may engage in air interface communication with the base station so as to communicate in turn with various remote entities on the transport network(s) and/or with other WCDs served by the RAN.

In this arrangement, the air interface 20 may be configured according to a particular air interface protocol as discussed above, and the WCDs and base station may be programmed or otherwise configured to operate according to that protocol and according to the enhancement presently disclosed. According to the air interface protocol, air interface 20 may thus define a plurality of resource blocks for carrying communications between the WCDs and the base station. And according to the present disclosure, one or more such resource blocks may be deemed eligible to carry uplink data transmission from certain WCDs without the need for a corresponding resource block assignment request and grant, while all of the resource blocks (to the extent appropriate under the air interface protocol) may be deemed eligible to carry uplink data transmission pursuant to a resource block request and grant.

FIG. 1 generally represents any wireless communication system in which the present disclosure can be implemented, and, as noted above, variations on the arrangement shown are possible. To help illustrate features of the present disclosure, the remainder of this document will focus exclusively on an LTE system by way of example. Those of ordinary skill in the art will readily appreciate, however, that the disclosed principles can be applied as well in other types of wireless communication systems, with variations where appropriate.

Figure 2:
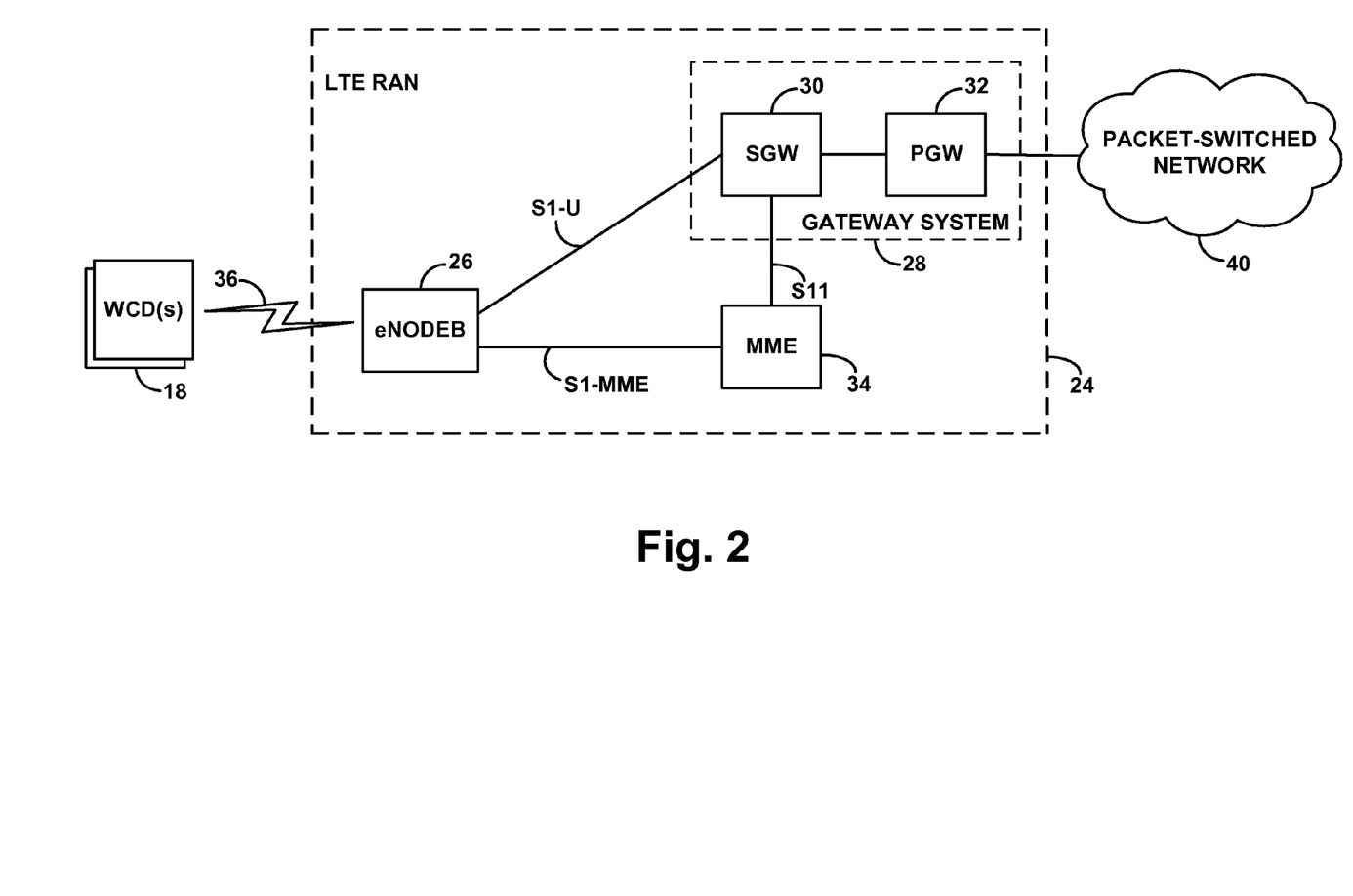
FIG. 2 is a simplified block diagram of an example LTE system in which the present disclosure can be implemented.

Accordingly, FIG. 2 is a simplified block diagram of a representative LTE system as an example of the system shown in FIG. 1. As shown in FIG. 2, the LTE system includes an LTE RAN 24 that primarily serves WCDs with wireless packet data communication service (but may also provide voice call service, such as voice-over-IP service or circuit-switched fallback service). The LTE RAN 24 is shown including a representative LTE base station 26 known as an eNodeB, a gateway system 28 including a serving gateway (SGW) 30 and a packet data network (PDN) gateway (PGW) 32, and a mobility management entity (MME) 34.

In practice, the eNodeB 26 includes an antenna structure and associated equipment for engaging in LTE communication over an LTE air interface 36 with WCDs 38, and the PGW 32 provides connectivity with a packet-switched network 40 such as the Internet. Further, the eNodeB communicates with the SGW over an S1-U interface, the eNodeB communicates with the MME over an S1-MME interface, and the MME communicates with the SGW over an S11 interface. Although each of these interfaces is shown as a direct link in the figure, in practice the various elements of the LTE RAN may sit as nodes on a wireless service provider's core packet network, and so these and other interfaces described herein may instead be logical connections over that packet network.

As noted above, a representative LTE air interface may span a particular frequency bandwidth and may be divided over time into 0.5 millisecond timeslots, with the frequency bandwidth being divided into 180 kHz wide resource blocks within each timeslot. In practice, these resource blocks may be numbered sequentially across the bandwidth, and groups of the resource blocks may define resource block groups that may be numbered as well. Overhead system information broadcast by the eNodeB may inform the WCDs in the coverage area which resource block and resource block groups are defined on the air interface, so that the WCDs can understand resource block assignments keyed to resource block number and resource block group number and can otherwise determine resource blocks in which to transmit data. Other LTE air interface configurations may be possible as well.

With this network arrangement, when a WCD enters into coverage of eNodeB 26, the WCD may register or "attach" with the LTE RAN by transmitting an attach request to the eNodeB, which the eNodeB would forward to the MME 34. The MME and other network elements may then carry out various functions to enable the LTE RAN to serve the WCD.

By way of example, the MME may engage in signaling with the gateway system and with the eNodeB in order to set up and manage one or more bearer connections extending between the WCD and the PGW and thus between the WCD and the packet-switched network 40. For instance, for each such bearer connection, the MME may create and store in data storage a context record defining an evolved packet system (EPS) bearer identity for the WCD, and the MME may generate and transmit to the SGW a create-session request identifying the serving eNodeB and triggering setup of a tunnel between the SGW and PGW and assignment of an IP address for the WCD. In this process, the PGW may also establish and store a context record for the WCD and may assign an IP address to the WCD, and the PGW may signal the assigned IP address in response to the SGW. The SGW may then transmit to the MME a create-session response specifying the assigned IP address.

Upon receipt of a create-session response from the SGW, the MME may then further generate and transmit to the eNodeB an attach-accept message identifying the SGW and specifying the assigned IP address, which may trigger setup of a tunnel between the eNodeB and the SGW and assignment of a corresponding radio bearer identity defining a tunnel between the WCD and the eNodeB. And the eNodeB may forward to the WCD an indication of the assigned IP address. Through this process, a bearer would thus be established between the WCD and the PGW, including a series of tunnels extending (i) between the WCD and the eNodeB, (ii) between the eNodeB and the SGW, and (iii) between the SGW and the PGW, and the WCD would have an assigned IP address that it can use for communication on the packet-switched network 40.

With each such bearer established, the eNodeB may then serve the WCD in a "connected mode" in which the eNodeB will manage transmission of data to and from the WCD, so that the WCD can engage in communication on network 40. In particular, in normal practice, when a WCD has data to transmit, the WCD may transmit to the eNodeB a control message specifying a quality of service level (e.g., Quality of Service Class Identifier (QCI)) of the data to be transmitted, such as "best efforts" or "real-time" for instance, and perhaps an indication of the quantity of data to be transmitted. The eNodeB may then apply a scheduling process by which eNodeB determines how many resource blocks to assign for uplink transmission the requested type and quantity of data, the eNodeB refers to a schedule of resource blocks in a coming timeslot, and the eNodeB assigns to the WCD a number of resource blocks as necessary and available. The eNodeB may then transmit to the WCD a control message (downlink control information) specifying the assigned resource block(s) by resource block number or resource block group number.

Upon receipt of such an assignment, the WCD may then some or all of the data at issue to the eNodeB as IP packets in the assigned resource block(s), with each packet bearing the WCD's assigned IP address as source address and an appropriate IP address as destination address. And upon receipt of that data transmitted in the assigned resource block(s), the eNodeB may then forward the data in an appropriate tunnel to the gateway system for transmission by the PGW onto the packet-switched network 40.

As discussed above, the present disclosure helps to address a problem that may arise where certain WCDs, such as embedded WCDs, may tend to transmit small amounts of data frequently, though the disclosed method can apply in other scenarios as well. Such WCDs may be designated members of a special class eligible to engage in uplink transmission of data without the need to request and receive a resource block assignment from the eNodeB.

The WCDs may be so designated in various ways that would enable them to identify themselves as being members of the special class when engaging in uplink transmission without requesting and receiving a resource block assignment. By way of example, each of the WCDs may be pre-provisioned during manufacture or at some other time with a special identifier that the eNodeB is programmed to interpret an indication of membership in the special class. Such an identifier might be a device identifier or subscriber identifier that falls within a range of device identifiers deemed to be indicative of such membership. Alternatively, the identifier may take some other form, such as a differentiated services code point (DSCP) value associated with the special class.

As another example, the WCDs may be dynamically provisioned with an indication of their membership in the special class. For instance, such an indication may take the form of an IP address in a particular subnet or other group that the eNodeB is programmed to interpret as indicating membership in the special class. In practice, when the PGW assigns an IP address to a WCD that profile data indicates is to be a member of this special class, the PGW may select an IP address accordingly and assign the selected IP address to the WCD. Other types of identifiers designating select WCDs as being members of the special class are possible as well, and the eNodeB would optimally be programmed to interpret the identifiers accordingly.

Furthermore, as noted above, one or more particular resource blocks on the air interface may be designated for use to carry uplink data transmission from WCDs in the special class without a corresponding resource block request and assignment, but each such resource block may also remain available for assignment by the eNodeB to other WCDs as needed or appropriate. By way of example, the eNodeB may designate the one or more particular resource blocks by specifying the one or more particular resource blocks in an overhead broadcast message, and the WCDs in the special class may receive and note the resource block(s) so specified. As another example, the eNodeB and each special-class WCD may be pre-provisioned to treat one or more resource blocks as the one or more particular resource blocks.

The one or more particular resource blocks for this purpose may be one or more particular resource blocks that recur periodically, such as a particular numbered resource block in each frame, in every Nth frame, or the like. Alternatively, other arrangements are possible. Further, at a limit, most or all of the resource blocks across the bandwidth could be designated as being the particular resource blocks, although such an implementation may be burdensome for the eNodeB as the eNodeB may then need to evaluate every single such resource block to check for the presence of uplink data even when the eNodeB has not assigned the resource block to any particular WCD.

Provided with this arrangement, the eNodeB may thus receive uplink data transmission in at least one of the one or more particular resource blocks and may process the data accordingly. In particular, for each such resource block in which the eNodeB receives data, if the eNodeB had assigned that particular resource block to a WCD, then the eNodeB may forward the received data on a bearer to the SGW, for transmission to the PGW, and for transmission in turn onto the packet-switched network. Whereas, if the eNodeB had not assigned that particular resource to a WCD, then the eNodeB may decide whether the WCD from which the data was transmitted is a member of the special class and (i) if so may forward the data over an appropriate bearer (e.g., a bearer established for that WCD or a bearer established for the special class generally for instance) to the gateway system for transmission onto the packet-switched network but (ii) if not, may discard the received data (i.e., do not forward it to the gateway system for transmission onto the packet-switched network).

To facilitate this in practice, the WCD in the special class may include in its uplink data transmission an identifier of the type discussed above, that indicates its membership in the special class. For example, if the identifier is a DSCP value, the WCD may programmatically include that DSCP value in its uplink data transmission, such as in a header or payload portion of its transmission. And as another example, if the identifier is an IP address, the WCD may include that IP address as its source IP address in the transmission. Upon receipt of the data, the eNodeB may then perform deep packet inspection or more simple header inspection and read the identifier, and the eNodeB may thereby determine that the WCD is a member of the special class. And if so, the eNodeB may forward the data on to the gateway system. On the other hand, if the eNodeB does not find such an identifier indicative of membership in the special class or does not otherwise determine in some defined manner that the WCD that transmitted the data in the particular resource block without a corresponding resource block request and assignment is entitled to do so, the eNodeB may discard the data.

Figure 3:
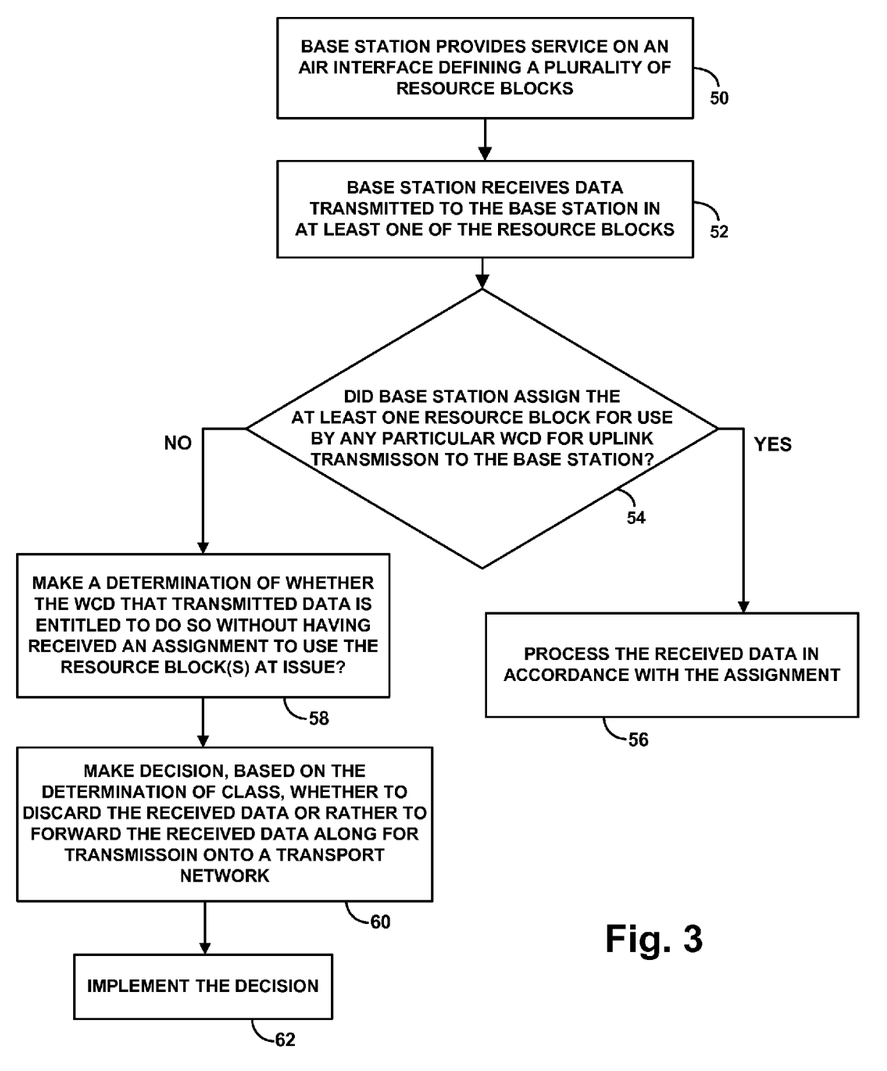
FIG. 3 is a flow chart depicting functions that can be carried out by way of example in accordance with the disclosure.

FIG. 3 is a flow chart depicting these functions from the perspective of a representative base station, such as eNodeB 26. As shown in FIG. 3, at block 50, the base station provides service on an air interface defining a plurality of resource blocks, such as an LTE air interface as discussed above for instance. At block 52, while providing that service, the base station receives data transmitted to the base station in at least one of the resource blocks. At block 54, which may occur before or after receiving the data or before or after detecting receipt of the data, the base station determines whether the base station has assigned the at least one resource block for use by any particular WCD for uplink transmission to the base station, such as by referring to the a record of currently assigned resource blocks.

If the determination at block 54 is affirmative, then at block 56 the base station processes the received data in accordance with the assignment. For instance, if the base station had assigned the resource block(s) at issue to a specific WCD, then the base station may forward the data in a bearer established for that WCD to a gateway system for transmission onto a transport network. Whereas, if the determination at block 54 is negative, then the base station determines if the WCD that transmitted data is entitled to do so without having received an assignment to use the resource block(s) at issue and only if so forwards the data along for transmission on the transport network.

In particular, if the determination at block 54 is negative, then at block 58, the base station determines a class of WCD from which the data was transmitted to the base station in the resource block(s), such as by reading the received data to determine a WCD class specified in the data. In the event there is no class indicator, the base station may treat that as a determination that the class of the WCD is standard or not the special class of this disclosure. At block 60, the base station then makes a decision based on the determined class of whether to discard the received data or rather to forward the received data along for transmission onto a transport network. For instance, if the determined class is one that the base station is provisioned to treat as indicative of entitlement (authorization) to engage in uplink transmission in the resource block(s) without a corresponding resource block assignment, then the base station decision may be to forward the received data along for transmission onto the transport network. Whereas, if the determined class is not one that the base station is provisioned to treat as indicative of entitlement to engage in uplink transmission in the resource block(s) without a corresponding resource block assignment, then the base station decision may be to discard the received data.

At block 62 the base station then implements the decision made at block 60. For instance, if the decision is to forward the data along for transmission onto the transport network, then the base station may forward the data along for transmission onto the transport network. Whereas, if the decision is to discard the data, then the base station may discard the data (i.e., not forward it along for transmission onto the transport network).

Figure 4:
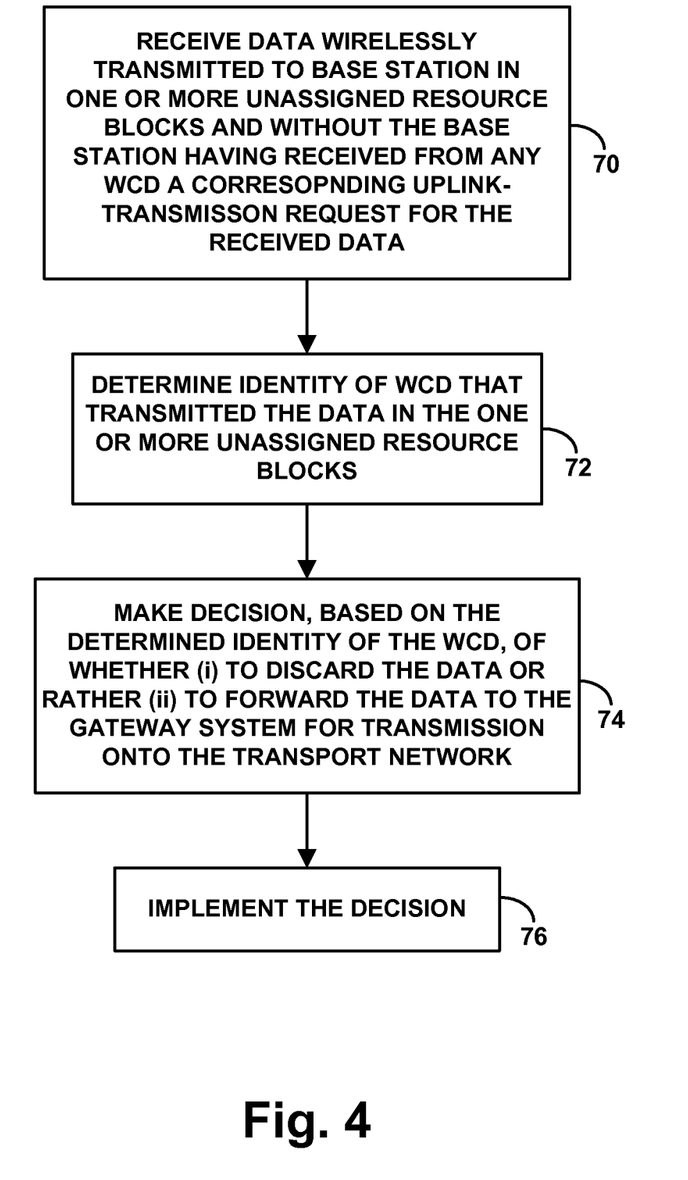
FIG. 4 is another flow chart depicting functions that can be carried out by way of example in accordance with the disclosure.

FIG. 4 is next another flow chart depicting functions that can be carried out in accordance with the present disclosure. In particular, these functions can be carried out in a wireless communication system in which a base station operates on an air interface defining a plurality of resource blocks for wirelessly carrying data transmitted from WCDs to the base station, and where the base station normally assigns the resource blocks to the WCDs in response to uplink-transmission requests received from the WCDs, and the base station normally receives data wirelessly transmitted from the WCDs in the assigned resource blocks and passes the received data along to a gateway system for transmission of the data onto a transport network.

As shown in FIG. 4, at block 70, the base station receives data wirelessly transmitted to the base station in one or more unassigned resource blocks and without the base station having received from any WCD a corresponding uplink-transmission request for the received data. A "corresponding uplink-transmission request" in this regard means a request (e.g., LTE service request) for transmission of the data to the base station for resource block assignment for transmission of the data to the base station.

At block 72, the base station determines an identity of a WCD that transmitted the data in the one or more unassigned resource blocks, again possibly by reading from the received data an identifier (e.g., IP address or DSCP value) of the WCD, such as a class identifier for instance, to extract (discern) from the data the WCD's identity such as the WCD's class. At block 74, the base station then makes a decision, based on the determined identity of the WCD, of whether (i) to discard the data received in the one or more unassigned resource blocks or rather (ii) to forward the data received in the one or more unassigned resource blocks to the gateway system for transmission onto the transport network. And at block 76, the base station implements the decision.

As discussed above, the air interface in such a wireless communication system may define a particular frequency bandwidth, and each of a continuous series of timeslots may define a certain number of the resource blocks across the frequency bandwidth. By way of example, the air interface may be an LTE air interface of the type discussed above.

Further, of the plurality of resource blocks, the base station may be programmed to treat just particular ones of the resource blocks as being eligible to carry uplink transmission of data without any corresponding uplink transmission request and without base station assignment of the particular resource blocks for carrying uplink transmission of data, but the base station may be programmed to treat all of the resource blocks as being eligible to be assigned for use to carry uplink transmission of data. In this arrangement, as well as others, the base station may further determine which of the particular resource blocks is currently unassigned for uplink transmission, and the base station may evaluate each particular resource block determined to be currently unassigned for uplink transmission to determine whether the particular resource block carries data, and may thereby determine that the one or more unassigned resource blocks carry the received data.

Figure 5:
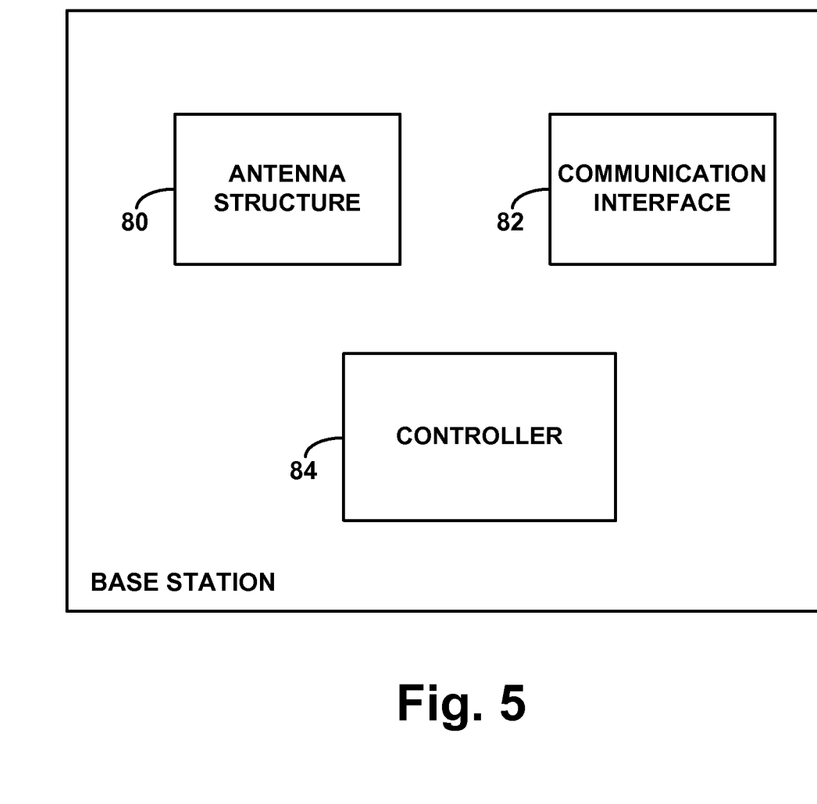
FIG. 5 is a simplified block diagram of an example base station operable in accordance with the present disclosure.

FIG. 5 is next a simplified block diagram of a cellular base station, such as an eNodeB, arranged to carry out functions such as those described above. As shown in FIG. 5, the base station includes an antenna structure 80, arranged to transmit and receive over an air interface, where the air interface defines a plurality of resource blocks. Further, the base station includes a communication interface 82 for communicating with supporting network infrastructure, such a gateway system for instance. And the base station includes a controller 84, which function to control implementation of various base station functions. The controller may comprise a processing unit programmed with instructions executable to carry out the various functions for instance.

In line with the discussion above, the controller may thus be arranged to receive data that wirelessly arrived at the antenna structure in at least one of the resource blocks. Further, the controller may be arranged to make a determination, upon receipt of the data, of whether the at least one resource block was assigned for use by any particular wireless communication device for uplink transmission to the cellular base station, and (a) if the determination is affirmative, then to cause the base station to process the received data in accordance with the assignment but (b) if the determination is negative, then (i) to determine a class of WCD from which the data was transmitted to the cellular base station in the at least one resource block, (ii) based on the determined class, to make a decision of whether to discard the received data or rather to forward the received data along to a gateway system for transmission onto a transport network, and (iii) causing the base station to implement the decision.

Further, as discussed above, the cellular base station may be programmed (i) to treat just particular ones of the resource blocks as being eligible to carry uplink transmission of data without any corresponding uplink transmission request and without assignment by the cellular base station of the particular resource blocks for carrying uplink transmission of data, but (ii) to treat all of the resource blocks as being eligible to be assigned for use to carry uplink transmission of data. And as additionally discussed above, the received data may specify the class of WCD, and the act of determining the class of WCD may involve reading the received data to determine the class.

Exemplary embodiments have been described above. It should be understood, however, that variations from these embodiments are possible, while remaining within the true spirit and scope of the invention.

We claim:

1. A method comprising:
   providing, by a cellular base station, service on an air interface defining a plurality of resource blocks;
   wirelessly receiving into the cellular base station data transmitted to the cellular base station in at least one of the resource blocks;
   making a determination, by the cellular base station, of whether the base station has assigned the at least one resource block for use by any particular wireless communication device (WCD) for uplink transmission to the cellular base station;

if the determination is affirmative, then processing, by the cellular base station, the received data in accordance with the assignment; and if the determination is negative, then (i) determining, by the cellular base station, a class of WCD from which the data was transmitted to the cellular base station in the at least one resource block, (ii) based on the determined class, making a decision, by the cellular base station, of whether to discard the received data or rather to forward the received data along for transmission onto a transport network, and (iii) implementing, by the cellular base station, the decision.

2. The method of claim 1, wherein, of the plurality of resource blocks, (i) the cellular base station is programmed to treat just particular ones of the resource blocks as being eligible to carry uplink transmission of data without any corresponding uplink transmission request and without assignment by the cellular base station of the particular resource blocks for carrying uplink transmission of data, but (ii) the cellular base station is programmed to treat all of the resource blocks as being eligible to be assigned for use to carry uplink transmission of data.

3. The method of claim 1, wherein the received data specifies the class of WCD, and wherein determining the class of WCD comprises reading the received data to determine the class.

4. The method of claim 3, wherein reading the received data to determine the class comprises reading from the data a differentiated services code point (DSCP) value representative of the class.

5. The method of claim 1, wherein implementing the decision comprises:
   if the decision is to discard the data, then discarding the data rather than forwarding the data to the gateway system; and
   if the decision is to forward the data along for transmission onto the transport network, then forwarding the data along for transmission onto the transport network.

6. A method operable in a wireless communication system in which a base station operates on an air interface defining a plurality of resource blocks for wirelessly carrying data transmitted from wireless communication devices (WCDs) to the base station, wherein the base station normally assigns the resource blocks to the WCDs in response to uplink-transmission requests received from the WCDs, and wherein the base station normally receives data wirelessly transmitted from the WCDs in the assigned resource blocks and passes the received data along to a gateway system for transmission of the data onto a transport network, the method comprising:
   receiving, by the base station, data wirelessly transmitted to the base station in one or more unassigned resource blocks and without the base station having received from any WCD a corresponding uplink-transmission request for the received data;
   determining, by the base station, an identity of a WCD that transmitted the data in the one or more unassigned resource blocks;
   based on the determined identity of the WCD, making a decision by the base station of whether (i) to discard the data received in the one or more unassigned resource blocks or rather (ii) to forward the data received in the one or more unassigned resource blocks to the gateway system for transmission onto the transport network; and
   implementing, by the base station, the decision.

7. The method of claim 6, wherein the air interface defines a particular frequency bandwidth, and wherein each of a continuous series of timeslots defines a certain number of the resource blocks across the frequency bandwidth.

8. The method of claim 6, wherein the air interface is a Long Term Evolution (LTE) air interface.

9. The method of claim 6, wherein, of the plurality of resource blocks, (i) the base station is programmed to treat just particular ones of the resource blocks as being eligible to carry uplink transmission of data without any corresponding uplink transmission request and without base station assignment of the particular resource blocks for carrying uplink transmission of data, but (ii) the base station is programmed to treat all of the resource blocks as being eligible to be assigned for use to carry uplink transmission of data.

10. The method of claim 9, further comprising:
   determining which of the particular resource blocks is currently unassigned for uplink transmission; and
   evaluating each particular resource block determined to be currently unassigned for uplink transmission to determine whether the particular resource block carries data, and thereby determining that the one or more unassigned resource blocks carry the received data.

11. The method of claim 6, wherein determining the identity of the WCD that transmitted the data in the one or more unassigned resource blocks comprises reading the data to extract from the data an identifier of the WCD.

12. The method of claim 11, wherein the identifier of the WCD comprises an Internet Protocol (IP) address of the WCD.

13. The method of claim 6, wherein the identity of the WCD that transmitted the data in the one or more unassigned resource blocks is an identity of a class of which the WCD is a member.

14. The method of claim 13, wherein determining the identity of the WCD that transmitted the data in the one or more unassigned resource blocks comprises reading the data to extract from the data an indication of the class.

15. The method of claim 14, wherein the indication is a differentiated services code point (DSCP) value.

16. The method of claim 6, wherein making the decision of whether to discard or forward the data based on the determined identity of the WCD comprises:
   making a determination, based on the determined identity of the WCD, whether the WCD is authorized to transmit data in the one or more resource blocks without having received from the base station an assignment of the one or more resource blocks;
   if the determination is affirmative, then making the decision to forward the data; and
   if the determination is negative, then making the decision to discard the data.

17. The method of claim 6, wherein implementing the decision comprises:
   if the decision is to forward the data to the gateway system, then forwarding the data to the gateway system; and
   if the decision is to discard the data, then discarding the data rather than forwarding the data to the gateway system.

18. A cellular base station comprising:
   an antenna structure arranged to transmit and receive over an air interface, wherein the air interface defines a plurality of resource blocks; and
   a controller,
   wherein the controller is arranged to receive data that wirelessly arrived at the antenna structure in at least one of the resource blocks, wherein the controller is arranged to make a determination, upon receipt of the data, of whether the at least one resource block was assigned for use by any particular wireless communication device for uplink transmission to the cellular base station, and (a) if the determination is affirmative, then causing the base station to process the received data in accordance with the assignment, but (b) if the determination is negative, then (i) determining a class of wireless communication device from which the data was transmitted to the cellular base station in the at least one resource block, (ii) based on the determined class, making a decision of whether to discard the received data or rather to forward the received data along to a gateway system for transmission onto a transport network, and (iii) causing the base station to implement the decision.

19. The cellular base station of claim 18, wherein, of the plurality of resource blocks, (i) the cellular base station is programmed to treat just particular ones of the resource blocks as being eligible to carry uplink transmission of data without any corresponding uplink transmission request and without assignment by the cellular base station of the particular resource blocks for carrying uplink transmission of data, but (ii) the cellular base station is programmed to treat all of the resource blocks as being eligible to be assigned for use to carry uplink transmission of data.

20. The cellular base station of claim 18, wherein the received data specifies the class of WCD, and wherein determining the class of WCD comprises reading the received data to determine the class.

\* \* \* \* \*